Jan. 8, 1946.  R. R. FISHER  2,392,372
STEAM VAPORIZER
Filed July 17, 1944
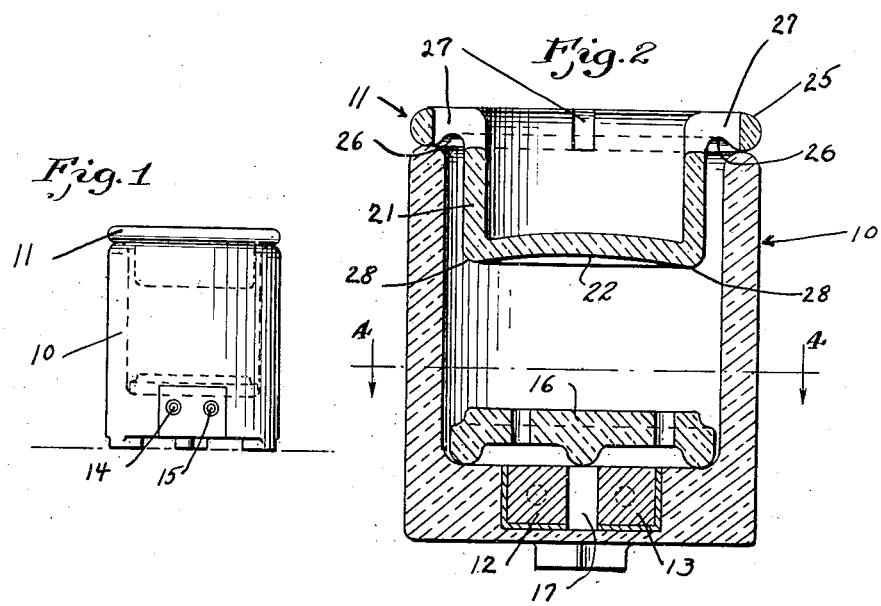
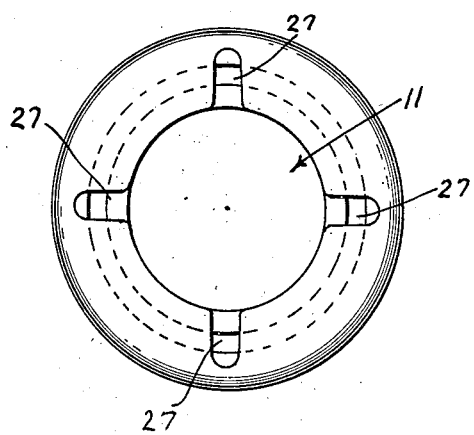
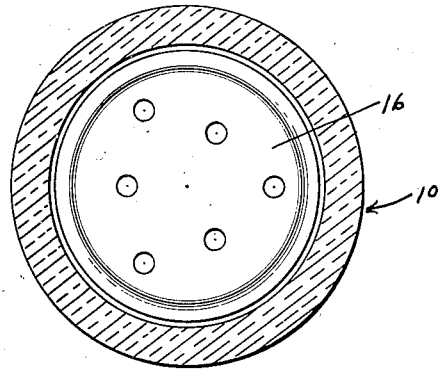
INVENTOR.
Roy R. Fisher
BY Barnes, Kisselle, Laughlin & Raisch
Attorneys.

Patented Jan. 8, 1946

2,392,372

UNITED STATES PATENT OFFICE 2,392,372

STEAM VAPORIZER

Roy R. Fisher, Detroit, Mich.

Application July 17, 1944, Serial No. 545,324

3 Claims. (Cl. 21—117)

This application relates to a steam vaporizer.

Reference is made to applicant's copending application, Serial No. 490,575, on a Bottle heater, filed June 12, 1943. There is shown and described a cup-shaped bottle warmer in which steam is electrically created for heating a nursing bottle.

The present invention contemplates an improved steam vaporizer for use in a nursery or sick room for persons who are bothered with chest congestion or cough. There are numerous types of steam vaporizers at present on the market but all of them are expensive and complicated or extremely inconvenient. The present invention contemplates the very simple device for effectively vaporizing a medical oil without causing loss of the same and in a way to get the most effective use of the vaporant.

Other objects and features of the invention will appear in the following description and claims:

In the drawing:

Fig. 1 is a side elevation of the assembly.

Fig. 2 is an enlarged sectional view of the assembly.

Fig. 3 is a plan view.

Fig. 4 is a sectional view on line 4—4 of Fig. 2.

The invention consists of a combination of a steam forming cup 10 and a receptacle 11 supported by the cup. The cup 10 may be formed of ceramic or other non-porous heat insulating material. It has two carbon electrodes 12 and 13 mounted in a base thereof with metal projections 14 and 15 for insertion in an electrical utility cord plug. The support 16 is used for supporting a nursery bottle while the same is being heated in the cup. Water is inserted in the cup and fills the chamber 17 thus completing an electrical circuit between electrodes 12 and 13 causing conversion of the water into steam which passes upwardly in the cup. The vaporant receptacle 11 has cylindrical sidewalls 21 with a base 22 shaped so that it presents a concave surface at the bottom and a convex surface on the top. Extending outwardly from the walls 21 is a rim 25.

The rim 25 has an undercut portion 26 the purpose of which will be explained below. It is also provided with radial slots 27.

In the operation of the device, a menthol oil is placed in the receptacle 11 to the depth of a quarter (¼") or half inch (½") on the bottom. The cup 10 is then filled with water up to about the half-way mark and the current is applied. The water will be heated and steam will be formed in cup 10 and it will tend to pass upward around receptacle 11. The concave bottom 22 tends to deflect the steam or trap it so that the heat is transferred directly to the bottom of the receptacle 11 with condensate dropping from the corners 28 back into the cup 10. Some steam will also pass upwardly around the walls 12 where it baffles against the undercut 26 transferring its heat to the receptacle 11 and then dropping back with condensate running down the walls 21. Steam also passes upwardly through the four apertures 27 where it joins with the vaporized fumes from the material in the receptacle 11.

Steam mixes with these fumes and carries them to the various parts of the room.

The present device has the advantage that live steam does not come into direct contact with the material to be vaporized; rather it mixes with the fumes or vapors above the material and carries them into the atmosphere. The advantage of this is that the boiling point of most of these vaporants is around 180° to 190° F. If the material is to be subjected to direct steam it tends to vaporize too rapidly thus giving too concentrated a vapor and wasting the medicant. The present device gets the most out of the steam by utilizing the concave baffling arrangement and the undercut portion 26. Then a small portion of the steam is fed out to mix with the vapors and distribute them as desired.

What I claim is:

1. A medical vaporizing combination comprising a steam producing vessel having an aperture at the top thereof and a vaporant receptacle supported in said aperture having substantially cylindrical sidewalls and a bottom with a concave surface and an outwardly extending upper rim having an undercut portion between the walls and the outer edge and provided with one or more apertures for the release of steam from the vessel to a point above the vaporant receptacle.

2. A medical vaporizing combination comprising a steam producing vessel having an aperture at the top thereof and a vaporant receptacle arranged to be supported on the annular rim of said aperture comprising cylindrical sidewalls and a bottom having a concave lower surface smaller in diameter than the aperture, and an outwardly extending annular rim adjacent the top of the receptacle serving as a support for the receptacle and having an undercut portion between the walls and the outer edge for trapping and condensing steam.

3. A medical vaporizing combination comprising a steam producing vessel having an aperture at the top thereof and a vaporant receptacle arranged to be supported on the annular rim of said aperture comprising cylindrical sidewalls and a bottom having a concave lower surface smaller in diameter than the aperture, and an outwardly extending annular rim adjacent the top of the receptacle serving as a support for the receptacle and having an undercut portion between the walls and the outer edge for trapping and condensing steam, said sidewalls being provided with one or more apertures adjacent the top thereof for permitting the release of steam from the vessel to a point above the vaporant containing portion of the receptacle.

ROY R. FISHER.